United States Patent [19]

Volkmann

[11] Patent Number: 4,836,727
[45] Date of Patent: Jun. 6, 1989

[54] TORQUE LIMITED PRESSED AND FORGED METAL NUT MEMBERS

[76] Inventor: Josef F. Volkmann, 3520 Maricopa St., Ste. 19, Torrance, Calif. 90503

[21] Appl. No.: 59,627

[22] Filed: Jun. 8, 1987

[51] Int. Cl.$^4$ ............................................. F16B 31/00
[52] U.S. Cl. .......................................... 411/4; 411/5; 411/432; 411/903
[58] Field of Search ............... 411/302, 303, 903, 907, 411/908, 432, 433, 3–7

[56] References Cited

U.S. PATENT DOCUMENTS

| | | | |
|---|---|---|---|
| 1,103,591 | 7/1914 | Kneass | 411/432 |
| 1,281,174 | 10/1918 | Kraft | 411/429 |
| 1,489,325 | 4/1924 | Kraft | 411/432 |
| 1,652,169 | 12/1927 | Fleming | 411/433 |
| 2,333,388 | 11/1943 | Poupitch | 411/302 |
| 2,358,832 | 9/1944 | Schonitzer et al. | 411/432 |
| 2,685,812 | 8/1954 | Dmitroff | 411/7 |
| 2,928,445 | 3/1960 | Van Buren, Jr. | 411/303 |
| 2,930,424 | 3/1960 | Van Buren, Jr. | 411/303 |
| 3,191,486 | 6/1965 | Gibbens | 411/4 |
| 3,267,792 | 8/1966 | Yackle | 411/4 |
| 3,273,443 | 9/1966 | Rubin | 411/7 |
| 3,280,689 | 10/1966 | Rubin | 411/6 |
| 3,289,524 | 12/1966 | Rubin | 411/7 |
| 3,449,998 | 6/1969 | Wing | 411/5 |
| 3,667,339 | 6/1972 | Dame | 411/4 |
| 3,929,054 | 12/1975 | Gutshall | 411/5 |
| 4,144,796 | 3/1979 | Richter et al. | 411/4 |
| 4,167,886 | 9/1979 | Seghezzi et al. | 411/4 |
| 4,715,756 | 12/1987 | Danico et al. | 411/432 X |

FOREIGN PATENT DOCUMENTS

| | | | |
|---|---|---|---|
| 964862 | 2/1950 | France | 411/303 |
| 668686 | 3/1952 | United Kingdom | 411/433 |

*Primary Examiner*—Lloyd A. Gall
*Attorney, Agent, or Firm*—Plante Strauss Vanderburgh

[57] ABSTRACT

There is disclosed a torque limiting fastener system for forged or pressed metal nuts. The stamped metal fasteners have a central, cylindrical sleeve, an annular ledge which is dependent from one end of the sleeve, and a surrounding skirt, generally with hexagonal flats, which forms an annular well about the cylindrical sleeve. The torque limiting characteristic is imparted to these fasteners by a drive member which is of approximately the same dimensions as the stamped or pressed metal fastener and which has a plurality of prongs which are received in apertures or recesses in the stamped fastener. The apertures can open into the annular well about the central sleeve of the fastener or can be placed in an annular flat base which is formed on some of the stamped metal fasteners. The drive member is formed of a suitable plastic material having a precisely controlled shear strength.

10 Claims, 3 Drawing Sheets

TORQUE LIMITED PRESSED AND FORGED METAL NUT MEMBERS

BACKGROUND OF INVENTION

1. Field of Invention

This invention relates to torque limiting fasteners and, in particular, to torque limited pressed, forged, or stamped metal nuts.

2. Brief Statement of the Prior Art

Torque limiting fasteners are commonly used in the aerospace industry. Typically, the torque limiting fasteners include a frangible fastener having a threaded collar and a distal wrenching ring separated by a notched section that provides a predetermined limiting torque which, when exceeded, permits the wrenching ring to shear from the threaded collar.

In U.S. Pat. No. 4,068,555, there is disclosed an inherently torque limited nut which has a drive ring that is secured to the nut body by a splined engagement. The drive ring is formed of a material of low shear strength, e.g., certain plastics, and the number and spacing of the splines provides a control of the torque which can be applied to the fastener through the drive ring.

Other torque limiting techniques have used drive collars which are linked to a fastener through radial pins which shear when the predetermined torque is exceeded; see U.S. Pat. Nos. 3,267,792 and 3,460,428.

Stamped or pressed metal fasteners are also used in the aerospace industry. These metal fasteners are light weight and self locking from the natural resiliency of the fastener.

Heretofore, there has been no torque limiting application of the stamped metal fasteners despite their popularity.

BRIEF STATEMENT OF THE INVENTION

This invention comprises a torque limiting fastener which includes a stamped or pressed metal nut fastener. Commonly the stamped metal fasteners have a central, cylindrical sleeve, an annular ledge which is dependent from one end of the sleeve, and a surrounding skirt, generally with hexagonal flats, which forms an annular well about the cylindrical sleeve. The torque limiting characteristic is imparted to these fasteners by a drive member which is of approximately the same dimensions as the stamped or pressed metal fastener and which has a plurality of prongs, or a protrusion, with a cross section adapted to be received in the annular well of the stamped fastener. The annular well is formed between the outer, flatted skirt and the inner cylindrical sleeve of the stamped metal fastener. By providing a protrusion with a mating cross section for receipt in the annular well, particularly in the filleted corners thereof, a very precisely controlled torque limiting assembly can be achieved. For this purpose, the drive member is formed of a suitable plastic material having a precisely controlled shear strength.

BRIEF DESCRIPTION OF THE DRAWINGS

The invention will be described with reference to the FIGURES of which.

DESCRIPTION OF PREFERRED EMBODIMENT

Figure 1:
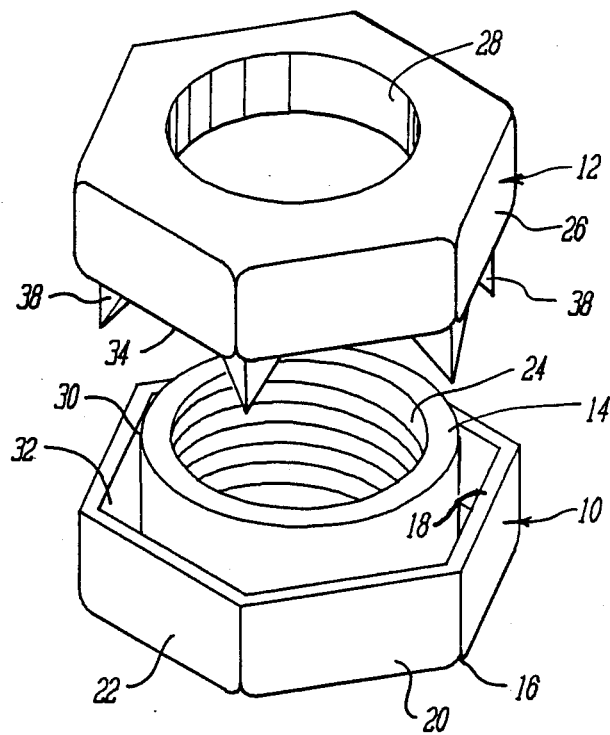
FIG. 1 is an exploded, perspective view of a torque limiting fastener system of the invention.

Referring now to FIG. 1, the fastener system of the invention is illustrated as comprising a pressed or stamped metal nut member 10 and a drive member 12. The two members are illustrated in exploded view, however, in most applications, they are to be supplied in assembly, nested together. The nut member 10 has a central cylindrical sleeve 14 which, on its lower end 16, has an annular ledge 18 and an outer, upstanding skirt 20 which, most commonly, is hexagonally flatted with a plurality of wrenching flats 22. The central cylindrical sleeve 14 has internal threads 24 for mating on the externally threaded bolt of the fastener system (not shown). The drive member 12 of the assembly can have the same general external shape as the nut member 10 and has hexagonal flats 26 on its outer surface. The drive member 12 has a central aperture 28 which can be entirely smooth walled, depending on the particular application.

The stamped nut member 10 has an annular recess 30 or well between the outer skirt 20 and the inner, central cylindrical sleeve 14, and this annular recess 30 has filleted corners 32 of increased thicknesses. The undersurface 34 of the drive member 12 bears a plurality of protrusions which can be in the form of prongs 38 which project from its undersurface. These prongs 38 are of appropriate spacing and mating cross section to be received in the filleted corners 32 of the annular recess 30 of nut member 10.

Figure 2:
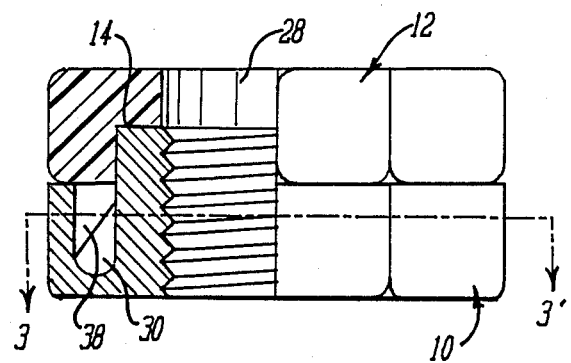
FIG. 2 is an elevational view in half cross section of the assembled fastener system shown in FIG. 1.
Figure 3:
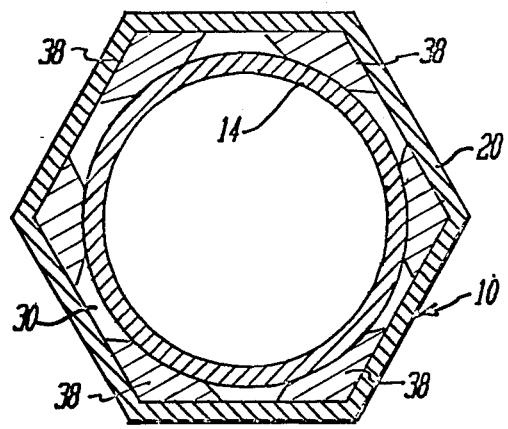
FIG. 3 is a view along line 3—3 of FIG. 2.

The assembly is shown in greater detail in FIG. 2. As there illustrated, the prongs 38 are received within the filleted corners of the annular recess 30 of nut member 10. The prongs 38 and their reception in the annular well of the nut member is further illustrated in FIG. 3. As there illustrated, the prongs 38 can be discontinuous and of a controlled or preselected width, filling the filleted corners but not filling the entire annular recess 30 to provide a controlled degree of limiting torque engagement between the drive member 12 and the nut member 10.

Figure 4:
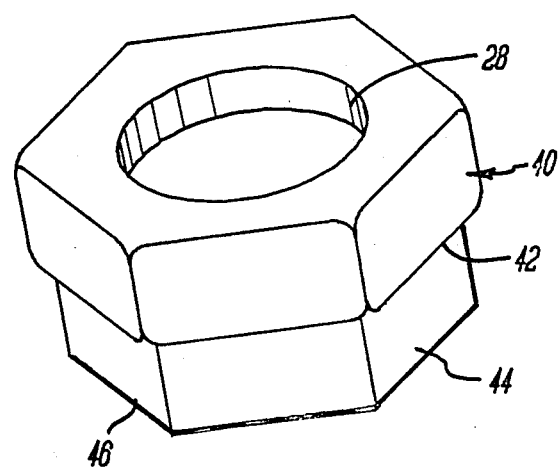
FIG. 4 is a perspective view of an alternative drive member for use in the fastener system.

The protrusion on the undersurface 34 of the nut member 10 can also be sized sufficiently to entirely fill the annular recess 30 (see FIG. 4) of the nut member 10. FIG. 4 illustrates such a drive member 40 in which the undersurface 42 of the drive member has a hexagonal protrusion 44 which is sized sufficiently to entirely fill the annular recess 30, thus including a continuous web portion 46 between each of the corner prongs of the drive member 40.

Figure 5:
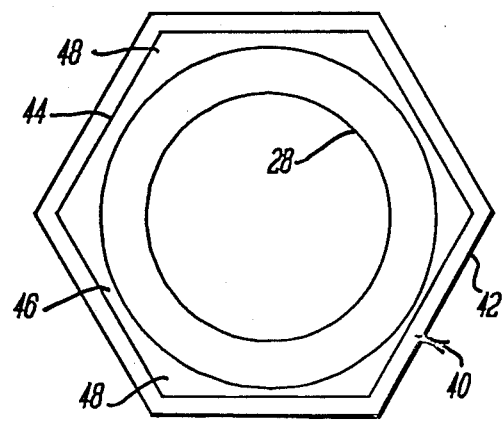
FIG. 5 is a bottom view of the drive member shown in FIG. 4.

This configuration is shown in greater detail by FIG. 5 which is a view of the undersurface 42 of the drive member 40 of FIG. 4. As there illustrated, the protrusion 44 is continuous and has relatively thin web portions 46 between the corner prongs 48 which are of substantially greater thickness.

Figure 6:
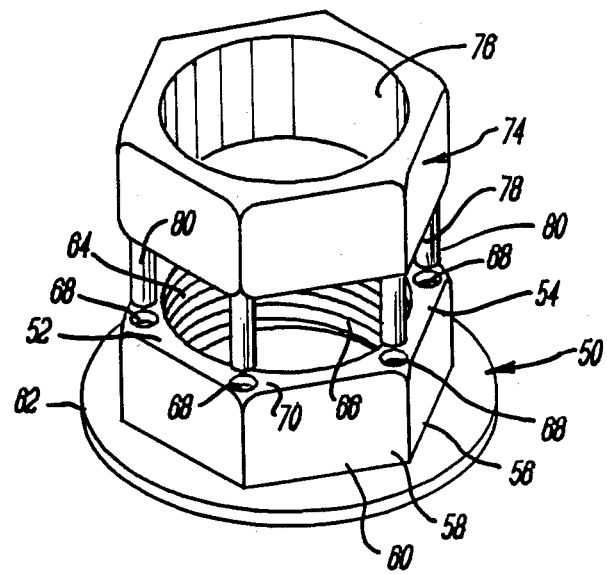
FIG. 6 is an exploded perspective view of the drive system of the invention as applied to an alternative stamped metal fastener.

Referring now to FIG. 6, the fastener system of the invention is applied to another pressed metal nut member 50. As there illustrated, the nut member 50 has a central cylindrical sleeve 52 and an upper, annular ledge 54 which, usually, is slightly tapered downwardly from the center of the central sleeve 52. The ledge 54 supports an outer skirt 56 of the nut member 50 which, typically, has hexagonal flats 58. The bottom edge 60 of this skirt 56 flares outwardly to form an annular collar 62 which is adapted to bear against the workpiece that is secured by the fastener. The internal wall 64 of the central sleeve has internal threads 66, thus permitting the application of this pressed metal nut member 50 onto standard threaded bolts and the like.

The invention is applied to this fastener by providing a plurality of apertures 68 in the filleted corners 70 of the nut member 50. The apertures 68 extend through the annular ledge 54 and open into the filleted corners 70 of the annular recess between skirt 56 and central sleeve 52 without penetrating the inner threads 66. A drive member 74 for this nut member 50 is provided also with a central aperture 76 that is entirely smooth walled. The undersurface 78 of the drive member 74 has a plurality of prongs 80 which are spaced about its undersurface 78 to coincide with the axis of each of the apertures 68 in the annular ledge 54 of the nut member 50. These prongs 80 are preselected of a suitable diameter or thickness which, together with the preselection of the plastic material used for fabrication of the drive member 74, imparts a predetermined, limiting torque which can be applied to the nut member 50 by the drive member 74.

Figure 7:
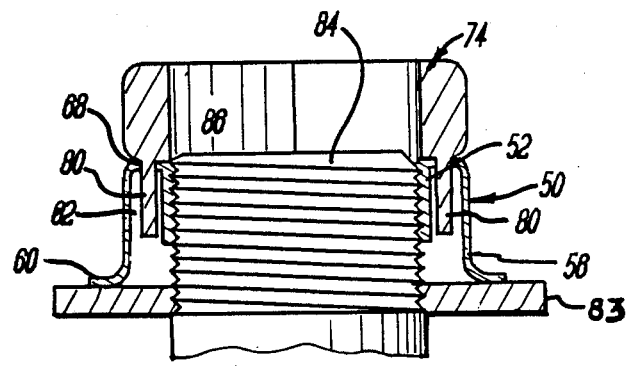
FIG. 7 is an elevational sectional view of the assembled fastener system shown in FIG. 6.

This assembly is shown in greater detail in FIG. 7. As illustrated in FIG. 7, the nut member 50 is shown as applied to a workpiece 83 having a bolt fastener 84 extending therethrough. The bolt fastener 84 is received in the cylindrical sleeve 52 of the nut member 50. The hexagonal flattened outer skirt 56 of the nut member 50 provides an annular recess 82 about the cylindrical sleeve 52 and the prongs 80 of the drive member 74 are received in this annular recess, extending through apertures 68 in the annular ledge of the nut member 50. As illustrated in FIG. 7, the nut member 50 is secured on bolt fastener 84, and the tension on the fastener will displace the annular ledge into a horizontal plane. In its relaxed position, the annular ledge of the nut member 50 has a high edge at the cylindrical sleeve 52 and is tapered outwardly and downwardly from the upper edge of the cylindrical sleeve 52. The bottom edge 60 of the outer skirt 56 is flared outwardly, thereby providing the annular collar which serves as a washer bearing against the workpiece 82.

The drive members of the invention can be separately molded or formed and the plastic material used in their fabrication as well as the size and number of prongs or size and thickness of the protrusions on their lower surfaces can be controlled to provide a predetermined and limiting torque to the fastener system. When this torque is exceeded, the protrusions, either the annular skirt shown in FIG. 4, or the plurality of prongs shown in FIGS. 1 and 6, will shear from the bodies of the drive members, rendering the drive members ineffective in any further transmission of torque to the nut members.

Figure 8:
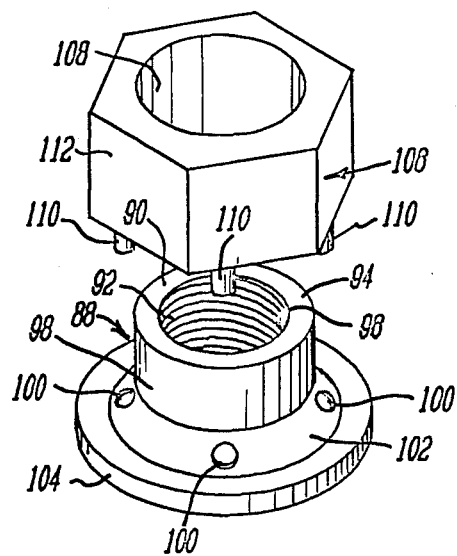
FIG. 8 illustrates an alternative fastener system of the invention.

The fastener system can also be applied to specially fabricated forged metal fasteners or collars such as illustrated in FIG. 8. As there illustrated, the nut member 88 has a central cylindrical sleeve 90 having threads 92 on its internal wall for engagement with a bolt or threaded fastener. The nut member 88 also has an annular ledge 94 which extends from the upper end edge 96 of the cylindrical sleeve 90, outwardly and terminates in an annular skirt 98 which, also is entirely cylindrical. This annular skirt 98 flares outwardly in a tapered or frustoconical section 102. At its lower end, the frustoconical section 102 is flared outwardly into an annular flat collar 104 which bears against the workpiece. The nut member 88 is provided with a plurality of apertures 100 in the frustoconical section 102.

The nut member 88 is secured to a bolt with the drive member 106, which has a central aperture 108 to be received over the cylindrical sleeve 90 and annular skirt 98. Preferably, the lower end of aperture 108 is bevelled outwardly (not shown) to receive the frustoconical section 102 when the drive member 106 is seated over the nut member 88. The lower edge of the drive member 106 has a mating plurality of prongs 110 which seat in the apertures 100 of the nut member 88. The drive member is provided with at least one, and preferably six flats 112 on its outer wall to accept a conventional wrenching tool.

As the annular skirt 98 of the nut member 88 is entirely cylindrical, it has no flats for wrenching and the torque limiting application of this locking nut member 88 cannot be defeated by overriding the limiting torque by the direct application of a wrenching tool to the nut member 88. Instead, all the fastening torque must be applied through the drive member 106 which, once it prongs have sheared from its lower edge, limits the amount of torque which can be applied.

Figure 9:
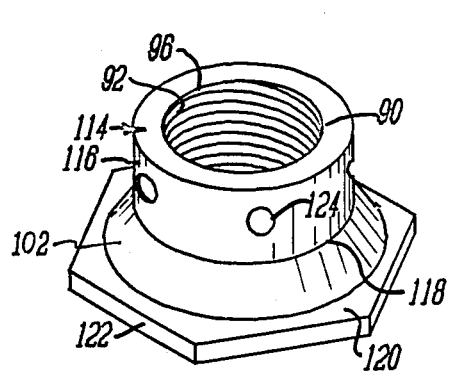
FIGS. 9-11 illustrate another alternative fastener system of the invention.
Figure 10:
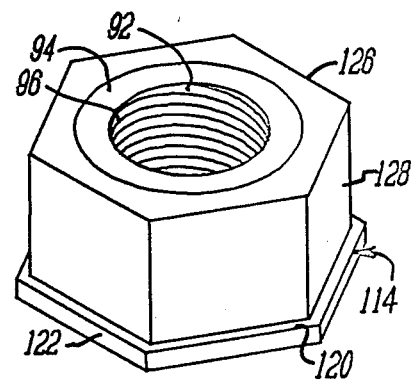
Figure 11:
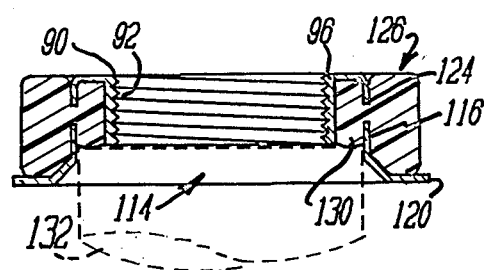

An alternative embodiment is illustrated in FIGS. 9–11. In this embodiment, a nut member 114 has a central cylindrical sleeve 90 having threads 92 on its internal wall for engagement with a bolt. At the upper end edge 96 of the cylindrical sleeve 90, the nut member 114 supports a cylindrical skirt 116 with its lower edge 118 flared outwardly with a frustoconical section 102. At its base, section 102 flares outwardly to form an annular collar 120. The collar 120 can be hexagonal, if desired to provide flats 122 to receive a wrench for its removal. A plurality of apertures 124 are provided in the skirt 116. The nut member 114 receives a drive member 126 which is molded onto the nut member to form a unitary assembly, which is shown in FIGS. 10 and 11. The upper surface of the drive member 126 can be flush with the top ledge 94 of nut member 114. The drive member 126 is formed of a suitable thermoplastic which can be injection molded onto the nut member, and is formed with wrenching flats 128, preferably in a conventional hexagonal pattern. As shown in the sectional elevational view of FIG. 11, the injection molding of the wrenching member forms prongs 130 which extend through the apertures 124 of the nut member 114, and substantially fill the well within the nut member. During molding a runner, or pin 132 (shown in phantom lines) is seated against the bottom edge of cylindrical sleeve 90, to restrict the flow of the plastic resin. The number and diameters of the apertures 124, and the resulting prongs 130 can be preselected to provide the desired limiting torque. Additionally this limiting torque can be controlled by the selection of the molding resin to provide a preselected shear strength for the prongs 130.

Figure 12:
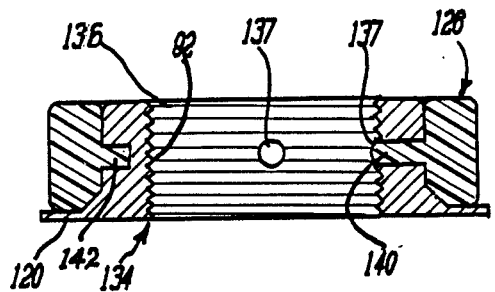
FIG. 12 is an elevational sectional view of the invention as applied to a forged nut.

The fastener system of FIGS. 8-11 can also be applied to a forged, rather than a stamped, nut. FIG. 12 illustrates this application. The nut 134 is formed of a solid forging and has a central through aperture 136 which has internal threads 92 and an annular collar 120. The nut 134 has a plurality of radial bores which can terminate short of complete penetration, thereby leaving the internal threads 92 intact. Some or all of these radial bores can extend entirely through the threads 92; these are radial bores 137. The drive member 126 is formed on the aforementioned nut 134 with the external shape such as shown in FIGS. 8 and 10. During its molding on the nut member 134, the plastic resin extrudes into the bores, filling these bores and forming prongs 142. The plastic resin will also extrude into apertures 137, into the through aperture 136, forming prongs 140 which will also serve as a thread lock to bind tightly against the externally threaded surface of a bolt received within the nut 134.

Figure 13:
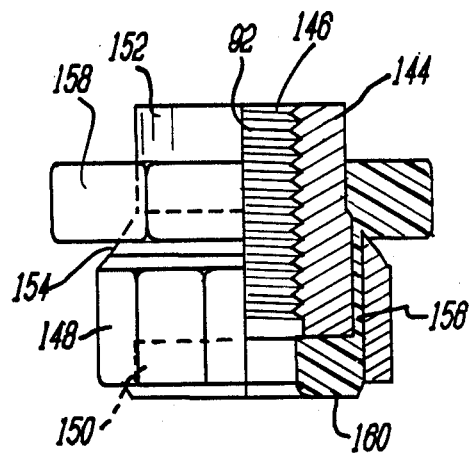
FIGS. 13-16 illustrate another application of the invention to a forged nut.
Figure 14:
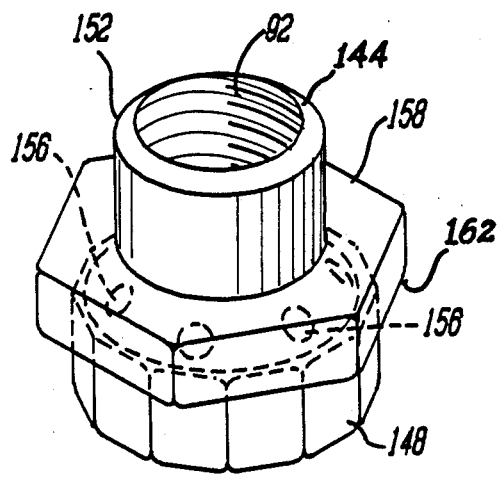
Figure 15:
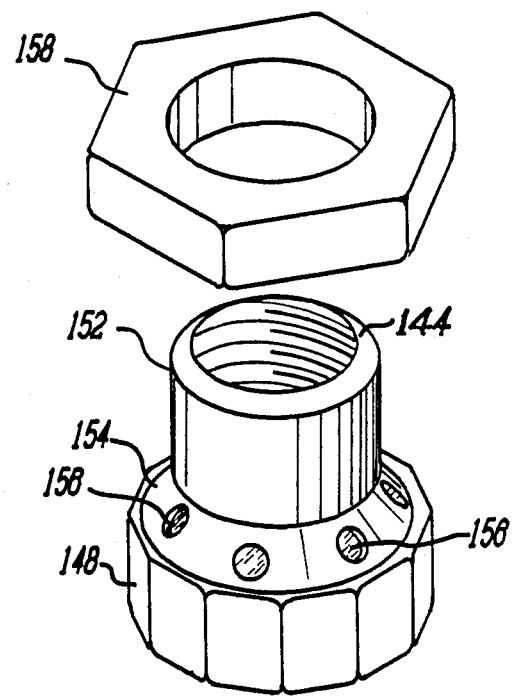

Referring now to FIGS. 13-15, the invention is shown as applied to a forged, solid nut member 144. This nut 144 has a central aperture 146 with internal threads 92, and a multi-flattened base 148. The base 148 has a counterbore 150. The nut 144 has a smaller diameter neck 152 with a conical intermediate section 154 which is provided with a plurality of through bores 156 which open into counterbore 150. The drive member 158 is molded onto the nut member 144 and the plastic resin extrudes through the through bores 156 and into the counterbore 150. During molding a runner or pin (not shown) is seated in the counterbore 150 to form the annular ring 160 which is formed entirely of the resin used for forming of the drive member and prongs, and which functions as a seal. This ring 160 has an internal diameter which is greater than the major diameter of threads 92. Preferably the seal ring extends a slight distance beyond the bottom of nut, to permit greater tolerance for deforming when the nut is applied to a bolt. Since the seal ring is deformed under compression, it conforms snugly about the shank of the bolt that receives the nut member.

FIG. 14 shows the nut 144 and drive member 158 prior to application to a bolt. The through bores 156 and the upper edge of the nut member 144 are shown in phantom lines.

FIG. 15 shows the drive member 158 separated from the nut member 144, as occurs when the limiting application torque is exceeded, and the prongs 142 are sheared from the undersurface 162 of drive member 158.

Figure 16:
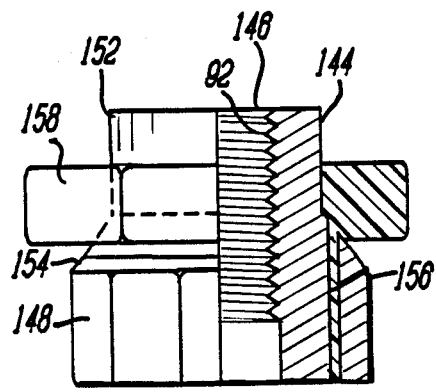
Figure 3:
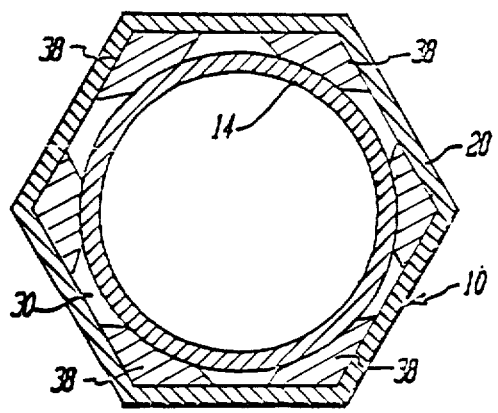
Figure 4:
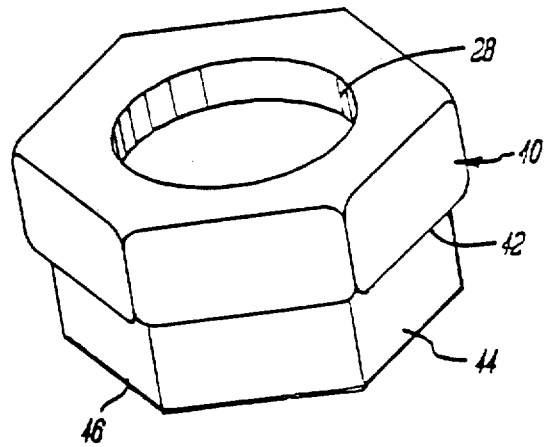
Figure 5:
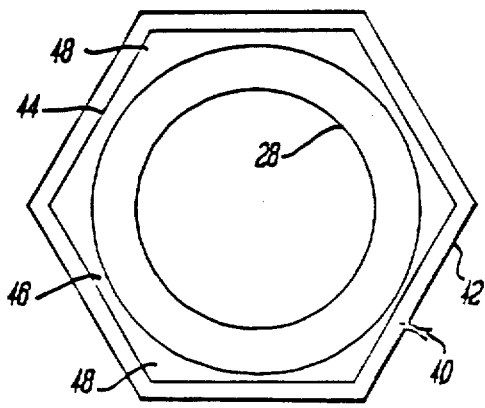
Figure 8:
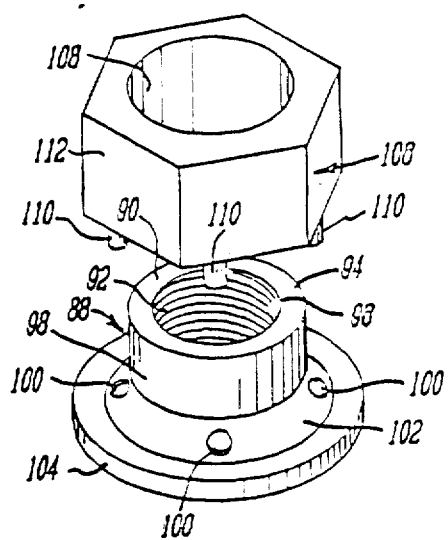
Figure 9:
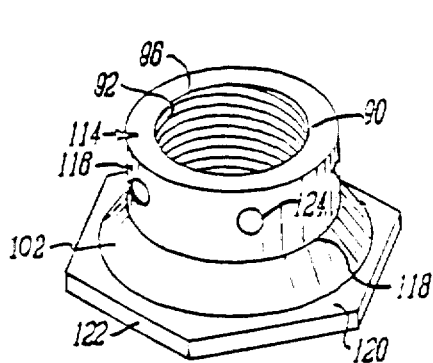
Figure 10:
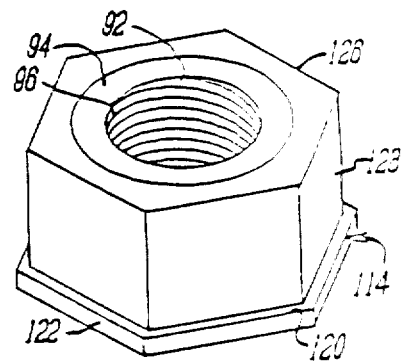
Figure 11:
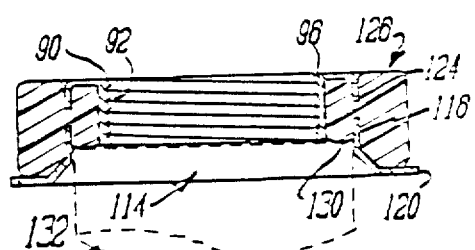

The nut and drive member shown in FIGS. 13-15 can also be provided without the thread lock 160. This embodiment is illustrated in FIG. 16 where the plastic drive ring 158 is formed on the nut 144, with prongs 142 which extend into the body of the nut 144. In contrast to the embodiment of FIGS. 13-15, the nut 144 shown in FIG. 16 does not have the counterbore 150, and the internal plastic ring 160.

As previously mentioned, the drive members of the invention are molded of suitable plastic preselected to provide the predetermined limiting torque for the fastener system. If desired, these drive members can be separately fabricated or, alternatively, can be directly molded into the fastener member, using injection molding in which the fastener is placed in the mold, lining the mold. The subsequent injection molding thus will form the drive member as an integrally molded element of a single fastener.

The stamped metal nut members are conventionally formed by stamping blanks from sheet stock and bending the blanks into the final nut member configurations. The forged nuts are manufactured by cold or warm heating methods.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A torque limiting fastener having:
  a. a nut member formed of pressed sheet metal and comprising:
    (1) a central cylindrical sleeve threaded on its internal wall;
    (2) an upper annular ledge outwardly dependent from the upper end of said sleeve;
    () a surrounding skirt downwardly dependent from the outer edge of said annular ledge and having an outwardly flared lower edge to form an annular collar; and
    (4) at least one aperture; and
  b. a drive member in juxtaposition to said nut and having:
    () a solid body having a central aperture of a size and shape to permit said drive member to be seated over said nut member; and
    (2) at least one frangible prong oriented to be received in said aperture when said drive member is seated on said nut member.

2. A torque limiting fastener having:
  a. a nut member formed of pressed sheet metal and comprising:
    (1) a central cylindrical sleeve threaded on its internal wall;
    (2) an annular ledge outwardly dependent from one end of said sleeve;
    (3) a skirt dependent from the outer edge of said annular ledge, surrounding said central cylindrical sleeve and forming an annular space therebetween; and
    (4) at least one aperture extending through said nut member and open to said annular space; and
  b. a drive member seated on said nut member and having:
    (1) a solid body having a central aperture of a size and shape to permit said drive member to be seated over said nut member; and
    (2) at least one frangible prong formed as a one-piece construction with said solid body and received in said aperture when said drive member is seated on said nut member.

3. The torque limiting fastener of claim 2 wherein said annular space has corner fillets which provide a plurality of said apertures.

4. The torque limiting fastener of claim 1 herein said skirt is hexagonal with six wrenching flats.

5. The torque limiting fastener of claim 3 wherein said drive member has a plurality of said prongs, one prong each aligned to be received in a respective one of said apertures.

6. The torque limiting fastener of claim 5 having at least one wrenching flat on said skirt.

7. The torque limiting fastener of claim 3 wherein said annular ledge has a plurality of apertures aligned with said corner fillets to provide open receptacles, and wherein a like plurality of prongs are spaced on the undersurface of said drive member to be received through said apertures and into said corner fillets.

8. The torque limiting fastener of claim 7 including six wrenching flats on said skirt.

9. The torque limiting fastener of claim 8 wherein said skirt has an outwardly flared lower edge to form an annular collar.

10. The torque limiting fastener of claim 8 wherein the annular ledge of said nut member is tapered.

* * * * *

UNITED STATES PATENT AND TRADEMARK OFFICE
CERTIFICATE OF CORRECTION

PATENT NO. : 4,836,727

DATED : June 6, 1989

INVENTOR(S) : Josef F. Volkmann

It is certified that error appears in the above-identified patent and that said Letters Patent is hereby corrected as shown below:

In The Grant Only insert Figures 3, 4, 5, 8, 9, 10 and 11 as shown on the attached sheets.

Signed and Sealed this

Sixteenth Day of January, 1990

*Attest:*

JEFFREY M. SAMUELS

*Attesting Officer*     *Acting Commissioner of Patents and Trademarks*